3,200,917
**AIR COOLED COMPACT CLUTCH
AND BRAKE**
Robert Herr, Remscheid, Otto Ortlinghaus, Wermelskirchen, Jurgen Lemp, Heide, Wermelskirchen, and Adolf Ortlinghaus, Remscheid, Germany, assignors to Gebr. Ortlinghaus, Wermelskirchen, Germany, a firm
Filed May 14, 1963, Ser. No. 292,508
9 Claims. (Cl. 192—18)

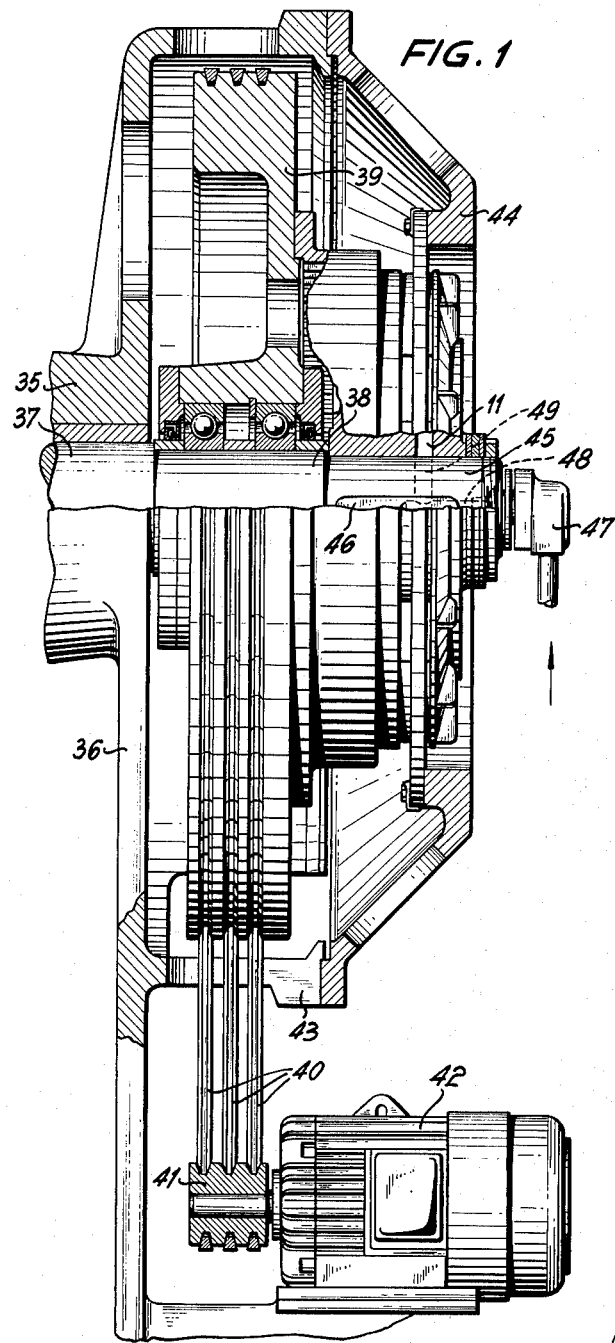

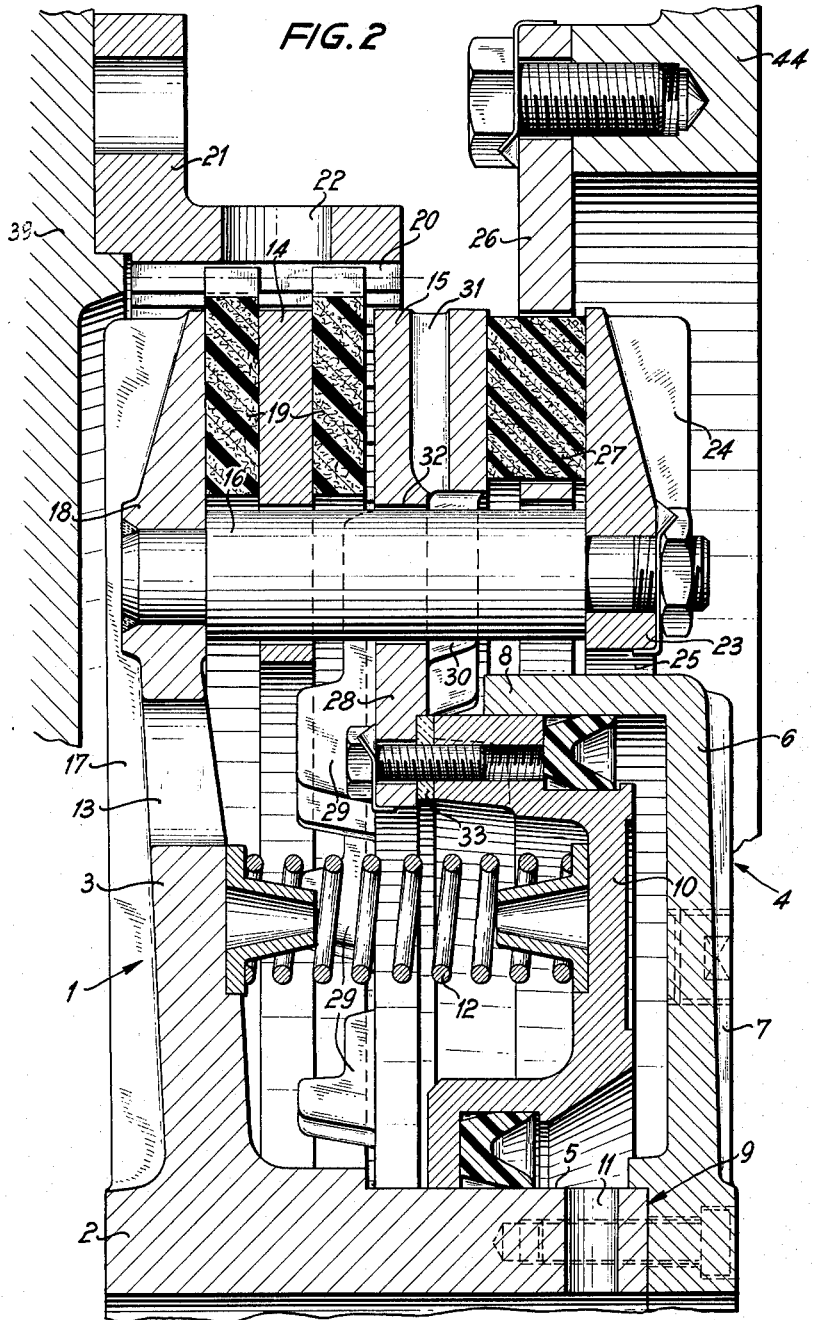

This invention relates to pressure medium operated friction clutches with associated brakes, which are primarily intended for driving power presses in which the movement of a crank or eccentric shaft driving a press die must be stopped immediately the clutch is disengaged. Therefore, the clutch is combined with a brake operating alternately therewith.

The invention relates more specifically to a pressure medium operated friction disc clutch with an associated brake and particularly intended for power presses, the clutch and the brake being adapted to be alternately engaged and disengaged through a spring-loaded ring piston which controls a pressure disc which can be urged transversely to its broadsides in one direction into engagement with a first friction disc arrangement connected with a rotatable outer clutch member and in the opposite direction into engagement with a non-rotatably mounted second friction disc arrangement. Known clutches of this type have the disadvantage that, viewed in axial direction, they occupy considerable space since the ring piston, the friction discs, the pressure disc and counter pressure discs are disposed axially one behind the other so that particularly when using the clutch in a power press with an overhung flywheel this will result in serious disadvantages. As in the known forms of construction the base of a cylinder receiving the ring piston serves at the same time as a counter pressure disc, a very considerable amount of heat is transmitted to the parts of the cylinder during the operation of the brake so that the cylinder may be distorted and an efficient operation of the reciprocable ring piston is not ensured. Furthermore, there is the risk of the material of gaskets provided on the piston being subjected to the action of heat beyond the permissible extent. In addition, in the known forms of construction the piston acts on the pressure disc through an interposed transmission member so that the reliability of operation may be impaired by canting or jamming of the shiftably mounted transmission member, especially since distortion of the parts due to insufficient removal of heat can hardly be avoided.

These disadvantages are avoided by the present invention by providing a clutch of the above-specified type which, while being of short axial over-all length and providing sufficient cooling of the structural parts, ensures efficient operation even when the clutch is used in conjunction with an overhung flywheel of a power press. To achieve this, a ring cylinder guiding the ring piston is suggested according to the invention to extend into a free inner space of the friction disc arrangement, leaving an annular gap permitting the entry of cooling air, the ring piston being connected to an inner marginal region of the pressure disc. On the end of a hub of a clutch member opposite to the ring cylinder there is expediently disposed a flange which has apertures permitting the axial entry of cooling air and carries bolts on which the friction discs and the pressure disc are axially shiftable, pressure springs which act on the ring piston bearing at their one ends against the flange of the clutch member. By constructing the clutch in this manner it is achieved that both springs and the ring cylinder are practically not subjected to any thermal stresses. In this arrangement a counter pressure disc associated with the brake is expediently detachably fixed at the ends of the bolts and embraces the ring cylinder, leaving the annular gap permitting the entry of cooling air so that cooling air can be supplied in axial direction to the friction discs and the pressure disc from both ends of the clutch.

To prevent heat from being transmitted to an impermissible extent to the material of the piston through the pressure disc connected to the ring piston, it is furthermore proposed to dispose between the pressure disc and the piston a ring or rings of a material which is a bad heat conductor, such as for example asbestos. By means of the effective heat insulation of the ring cylinder provided according to the invention it is possible to give the cylinder a particularly simple construction by forming an inner wall of the cylinder by a peripheral surface of the hub of the clutch member and forming an outer cylinder wall with associated cylinder base in one piece of a ring having an L-shaped cross section and by connecting the cylinder base to an end face of the hub of the clutch member. With this construction the assembly of the parts is very simple.

The clutch constructed according to the invention permits a particularly effective cooling of the pressure disc by a current of cooling air directed axially against both surfaces of the pressure disc in the region of the bolts carrying the pressure disc, this cooling action being further substantially improved by fan blades provided on the pressure disc and extending substantially perpendicularly to the plane of the pressure disc and by axially directed apertures in the pressure disc.

A preferred embodiment of the invention will now be described by way of example and with reference to the accompanying drawings, in which:

FIG. 1 is a side elevational view, partly in section, of the part of a press such as a crank or eccentric press, on the driving side, and FIG. 2 is a partial section, on a larger scale, through a clutch arrangement combined with a brake according to the invention.

Referring to FIG. 1, in a bearing neck 35 of a frame 36 of a crank press or eccentric press there is rotatably mounted an end portion of a driving shaft 37 having an offset longitudinal portion 38 which projects from the bearing neck 35 and on which a freely rotatable V-belt pulley 39 constructed as a gyrating mass is guided. The V-belt pulley 39 is coupled by three V-belts 40 with a V-belt pulley 41 which is driven by a motor 42. The V-belt pulley 39 may be mounted on the longitudinal portion 38 of the driving shaft 37 in any desired manner. It is enclosed by an extension of the press frame 36 in the form of an annular collar having on its underside at least one aperture 43 which serves for the passage therethrough of the V-belts 40. A cover 44 is threadedly connected with the free edge of the annular collar-type extension of the press frame 36 and serves as a carrier for stationary braking means. When the press is in operation, the V-belt pulley 39 rotates continuously. For driving the press the V-belt pulley 39 must be temporarily coupled with the driving shaft 37 so as to be secured against independent rotation. When disengaging this coupling connection, the driving shaft 37 must be effectively braked to preclude uncontrollable movements of the press die. A combined clutching and braking device provided for performing these operations is particularly shown in FIG. 2. On a longitudinal portion 45 of the driving shaft 37 which is offset in relation to the longitudinal portion 38 thereof an inner clutch member 1 is non-rotatably held by a fitting key 46, this inner clutch member comprising a hub 2 and a flange 3 disposed at one end thereof and forming a counter pressure disc. Screwed to an end face 9 of the hub 2 which is on the right-hand side in FIG. 2 is a base 6 of a cupshaped cylinder 4 forming in conjunction with a peripheral surface 5 of the hub 2 a ring cylinder. The base 6 of the cylinder 4 is provided with cooling ribs 7. The ring cylinder is limited on its outer side by a skirt 8 and has a ring piston 10 slidably guided therein. The ring piston 10 is equipped in a known manner with V packing rings. Compressed air or another working medium can be introduced through a radial bore 11 in the hub 2 into the working space of the above-described arrangement, i.e. between the base 6 of the cylinder 4 and the piston 10. For this purpose, as shown in FIG. 1, a compressed-air supplying device 47 not participating in the rotation of the driving shaft 37 is connected to the outer end face of the driving shaft, from which supplying device a bore 48 extends parallel to the longitudinal axis of the driving shaft 37 and opens into a transverse bore 49 registering with the radial bore 11. Such a supplying device for a pressurized working medium is known per se.

The cooling ribs 7 disposed on the base 6 of the cylinder 4 extend in substantially radial direction and are so constructed that they also serve for stiffening and reinforcing the cylinder base. Pre-tensioned helical pressure springs 12 are clamped between the flange 3 and the face of the ring piston 10 remote from the cylinder base 6, and distributed over the inner circumference of the clutch arrangement. These pressure springs 12 act to displace the ring piston 10 in a direction toward the base 6 of the cylinder 4. The flange 3 has apertures 13 distributed over the circumference thereof which permit cooling air to enter the inner space of the clutch arrangement, and also has cooling ribs 17 on the outer face thereof and an outer border zone 18 which acts as a first counter pressure disc for the clutch arrangement. Bolts 16 are fixed in the flange 3 in uniform distribution over the circumference thereof and extend parallel to the driving shaft 37. The bolts 16 are passed through bores in the inner marginal region of a friction disc 14 which is shiftable on the bolts 16. Also shiftably guided on the bolts 16 is a pressure disc 15 having apertures 31 extending radially through the outer marginal region of the pressure disc. A second annular counter pressure disc 23 associated with the braking device is slipped onto the free ends of the bolts 16 and held in operative position by screw means. The counter pressure disc 23 is provided with cooling ribs 24. Thus the flange 3 with the bolts 16, the friction disc 14, the pressure disc 15 and the counter pressure disc 23 is non-rotatably coupled through the hub 2 with the driving shaft 37. Furthermore, the cylinder 4 is firmly connected to the hub 2 by screws. The pressure disc 15 has an inner marginal region 28 screwed to the ring piston 10, a heat-insulating insert 33 of asbestos or the like being interposed between these two parts. The pressure disc 15 is fitted on both sides with fan blades 29 and 30 by means of which cooling air arriving from both sides of the clutch can be accelerated radially outwardly, passing mainly through the apertures 31 in the pressure disc 15 but also between the friction surfaces actually separated from each other. Apart from apertures 32 receiving the bolts 16, further apertures are provided in the pressure disc 15 to assist in the passage of cooling air. It will be noted that the inside diameter of the counter pressure disc 23 is considerably larger than the diameter of the skirt 8 of the cylinder 4 so that an annular gap 25 is formed between these two parts which permits a sufficient amount of cooling air to enter the inner space of the clutch.

An outer clutch member 21 substantially in the form of a hollow cylinder, has a flange screwed to the V-belt pulley 39. The inner face of the outer clutch member 21 is provided with teeth 20 which are engaged by teeth of clutch discs 19 so that the latter are non-rotatably but shiftably held in the outer clutch member 21. The skirt portion of the outer clutch member has apertures 22 distributed over the circumference thereof which permit the passage therethrough of cooling air from the inner space of the clutch.

A non-rotatable annular disc 26 is screwed to the cover 44 of the press frame and has friction segments 27 mounted in apertures in the annular disc distributed over the circumference thereof.

When the driving shaft 37 is to be coupled with the continuously rotating V-belt pulley 39, compressed air is introduced through the bores 48, 49 and 11 into the working space of the ring cylinder arrangement. This causes the ring piston 10 to be displaced to the left in FIG. 2 against the spring load acting thereon, whereby the pressure disc 15 is pressed against the adjacent clutch disc 19 which in turn bears against the friction disc 14, pressing the other clutch disc 19 against the outer border zone 18 of the flange 3 which serves as a counter pressure disc. The power derived from the V-belt pulley 39 through the outer clutch member 21 will thus be transmitted by friction through the clutch discs 19 constantly rotating with the outer clutch member 21, to the pressure disc 15, the friction disc 14 and the outer border zone 18 of the flange 3 and thus to the hub 2 and the driving shaft 37 so that with this position of the parts the driving shaft 37 is entrained by the V-belt pulley 39.

When the drive of the shaft 37 is to be discontinued, the air in the working space of the ring cylinder arrangement is removed or the working medium contained therein discharged. As a result, the ring piston 10 yields to the action of the pressure springs 12, i.e. it is displaced to the right in FIG. 2, so that the pressure disc 15 is lifted off the discs 14, 18 and 19 and moved to the right to engage, under the action of the pressure springs 12, the friction segments 27 carried by the annular disc 26. The friction segments 27 in turn bear against the counter pressure disc 23. As the friction segments 27 are held by the non-rotatable annular disc 26, the movement of the driving shaft 37 is effectively braked and stopped immediately after the disengagement of the coupling connection until compressed air or the like is again introduced into the working space of the ring cylinder to initiate the next working operation.

It is readily apparent that the arrangement of the ring cylinder controlling the clutch within the various discs cooperating with each other by frictional engagement results in a very small over-all length of the combined clutching and braking device. Despite this efficient utilization of space no damage will arise by the development of heat caused by friction, since the ring cylinder is effectively insulated from the parts subject to the action of heat, i.e. between the ring cylinder and the counter pressure disc 23 there is formed the annular gap 25 permitting the passage of cooling air therethrough, whereas the ring piston 10 is insulated from the pressure disc 15 by the insert 33. Moreover, the development of heat in the frictionally cooperating parts is limited by the circulation of air brought about by the fan blades 29 and 30 of the pressure disc 15. The air can flow toward these fan blades not only through the annular gap 25 but also through the apertures 13 in the flange 3. In the outer ranges of the clutch the cooling is assisted by the apertures 31 in the pressure disc 15 which are provided to discharge the cooling air.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein. For instance, the fan blades effecting a circulation of air through the clutch may be arranged and constructed in a manner different from that described and shown in the drawings.

We claim:

1. In combination with a machine frame, a shaft turnably mounted in said frame, and a continuously rotating flywheel turnably mounted on said shaft, a pressure fluid operated clutch and brake mechanism for selectively coupling and uncoupling said flywheel and said shaft and for braking said shaft when said flywheel is uncoupled therefrom, said mechanism comprising hub means fixed to said shaft for rotation therewith and having at one end a radially extending flange forming a first counterpressure disc and at the opposite end an annular cylinder of an outer diameter smaller than that of said flange and having an open end facing said flange spaced therefrom and an opposite closed end; a plurality of bolts each fixed at one end thereof to said flange radially outwardly of said cylinder and extending in axial direction beyond said open end of said cylinder; a second annular counterpressure disc fixed to the other ends of said bolts and having an inner diameter larger than the outer diameter of said cylinder, said cylinder extending through said second annular counterpressure disc and forming an annular gap therewith; at least one annular clutch disc adjacent the side of said flange facing said first counterpressure disc and connected at the outer periphery thereof to said flywheel for rotation therewith; an annular brake disc adjacent the side of said second annular counterpressure disc facing said flange and non-rotatably connected to said frame, said cylinder extending also through said brake disc and spaced from the inner peripheral surface thereof so that cooling air passing through said gap may also pass through said brake disc; an annular piston slidably guided in said annular cylinder and forming with the closed end of the latter a pressure space, said piston projecting with an end thereof beyond said open end of said cylinder; an annular pressure disc sandwiched between said clutch disc and said brake disc and fixed to said one end of said piston for movement in axial direction therewith to engage, during movement of said piston in one direction, said brake disc and, during movement of said piston in opposite direction, said clutch disc, said bolts extending through said clutch disc, said pressure disc and said brake disc and guiding at least said pressure disc during axial movement thereof; spring means operatively connected to said piston for biasing the latter in said one direction; and passage means communicating with said pressure space for feeding pressure fluid in the latter for moving said piston against the force of said spring means in said opposite direction.

2. The combination as defined in claim 1, wherein two annular clutch discs and an annular friction disc sandwiched between said clutch discs are provided, said clutch discs and said friction discs being guided on said bolts.

3. The combination as set forth in claim 2, wherein a plurality of teeth integral with said clutch discs project respectively from the outer surface thereof and engaging with corresponding teeth fixed to said flywheel.

4. In combination with a machine frame, a shaft turnably mounted in said frame and a continuously rotating flywheel turnably mounted on said shaft, a pressure fluid operated clutch and brake mechanism for selectively coupling and uncoupling said flywheel and said shaft and for braking said shaft when said flywheel is uncoupled therefrom, said mechanism comprising a first counterpressure disc fixed to said shaft for rotation therewith; a second annular counterpressure disc coaxial with said first counterpressure disc and connected thereto a fixed distance therefrom for rotation therewith; at least one annular clutch disc adjacent said first counterpressure disc at the side thereof facing said second counterpressure disc and connected at the outer periphery thereof to said flywheel for rotation therewith; an annular brake disc adjacent said second counterpressure disc at the side thereof facing said first counterpressure disc and non-rotatably connected to said frame; an annular cylinder fixed to said shaft for rotation therewith and having an open end facing said first counterpressure disc and an opposite closed end, said cylinder extending with ample clearance through said second annular counterpressure disc and said brake disc so that cooling air may pass through said ample clearance; an annular piston slidably guided in said annular cylinder and having one end projecting beyond said open end of said cylinder, said piston defining with said closed end of said cylinder a pressure space; an annular pressure disc having an outer annular portion sandwiched between said clutch disc and said brake disc and being fixedly connected at an inner portion thereof to said one end of said piston for movement in axial direction therewith to engage, during movement of said piston in one direction, said brake disc and, during movement of said piston in opposite direction, said clutch disc, said outer portion of said annular pressure disc being formed with a plurality of radially extending bores communicating with said clearance so that cooling air passing through said clearance will pass in radial direction through said bores; spring means operatively connected to said piston for biasing the latter in said one direction; and passage means communicating with said pressure space for feeding pressure fluid in the latter for moving said piston against the force of said spring means in said opposite direction.

5. The combination as set forth in claim 4, wherein said pressure disc is provided at least on the side thereof facing said brake disc and inwardly of said outer annular portion thereof with a plurality of fan blades so that the latter will suck cooling air through said clearance and expel the cooling air through said bores in said outer annular portion.

6. The combination as set forth in claim 5, wherein said first counterpressure disc is formed with a plurality of openings therethrough and wherein said pressure disc is provided also on the other side thereof with a plurality of fan blades facing said openings.

7. The combination as set forth in claim 5, wherein said piston is formed with an annular depression facing said first counterpressure disc so that said depression will be flushed by cooling air sucked through said openings by said fan blades on said other side of said pressure disc.

8. The combination as set forth in claim 7, and including a layer of heat insulating material sandwiched between said one end of said piston and said inner portion of said annular pressure disc.

9. The combination as set forth in claim 4, wherein said annular piston is formed with an annular depression facing said first counterpressure disc and wherein said spring means are constituted by a plurality of compression springs respectively engaging with opposite ends thereof said first counterpressure disc and said piston, said compression springs extending in axial direction through said depression.

References Cited by the Examiner
UNITED STATES PATENTS

| 2,436,968 | 3/48 | Longfield | 192—18 |
| 2,472,452 | 6/49 | Wissman | 192—18 |
| 2,498,123 | 2/50 | Hobbs | 192—113 |
| 2,584,190 | 2/52 | Danly et al. | 192—18 |
| 2,674,356 | 4/54 | Eason | 192—18 |

FOREIGN PATENTS 329,495  6/58  Switzerland.

DON A. WAITE, *Primary Examiner.*

DAVID J. WILLIAMOWSKY, *Examiner.*